(12) United States Patent
Ohara

(10) Patent No.: US 8,335,995 B2
(45) Date of Patent: Dec. 18, 2012

(54) IMAGE FORMING APPARATUS, DISPLAY SWITCHING CONTROL METHOD, AND COMPUTER READABLE MEDIUM STORING PROGRAM THEREFOR

(75) Inventor: Kota Ohara, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 884 days.

(21) Appl. No.: 12/035,135

(22) Filed: Feb. 21, 2008

(65) Prior Publication Data
US 2009/0013272 A1 Jan. 8, 2009

(30) Foreign Application Priority Data
Jul. 5, 2007 (JP) ................................. 2007-177323

(51) Int. Cl.
G06F 3/048 (2006.01)
G06F 17/00 (2006.01)
G05B 19/42 (2006.01)

(52) U.S. Cl. .......... 715/789; 700/83; 700/232; 700/235; 715/764; 715/867

(58) Field of Classification Search .................. 715/764, 715/867, 789; 700/83, 232, 235
See application file for complete search history.

(56) References Cited

U.S. PATENT DOCUMENTS

| | | | |
|---|---|---|---|
| 5,623,680 A * | 4/1997 | Flora-Holmquist et al. .. | 712/232 |
| 5,946,646 A * | 8/1999 | Schena et al. ................. | 702/177 |
| 6,084,583 A * | 7/2000 | Gerszberg et al. ............ | 715/867 |
| 6,288,715 B1 * | 9/2001 | Bain et al. ..................... | 345/211 |
| 2002/0000984 A1 | 1/2002 | Asai et al. | |
| 2003/0169461 A1 * | 9/2003 | Gaebel et al. ................. | 358/442 |
| 2003/0234955 A1 * | 12/2003 | Chalstrom et al. ........... | 358/1.15 |
| 2006/0117197 A1 * | 6/2006 | Nurmi ........................... | 713/323 |
| 2006/0125814 A1 | 6/2006 | Asai et al. | |
| 2006/0152742 A1 * | 7/2006 | Kawabata ..................... | 358/1.1 |

FOREIGN PATENT DOCUMENTS

| | | |
|---|---|---|
| JP | 2001-211270 A | 8/2001 |
| JP | 2001-331158 A | 11/2001 |
| JP | 2002-311936 A | 10/2002 |
| JP | 2003-323083 A | 11/2003 |
| JP | 2004-208239 A | 7/2004 |

OTHER PUBLICATIONS

Notification of Reasons for Refusal issued Apr. 2, 2012 for corresponding Japanese Application No. 2007-177323.

* cited by examiner

Primary Examiner — Weilun Lo
Assistant Examiner — Amy M Levy
(74) Attorney, Agent, or Firm — Sughrue Mion, PLLC

(57) ABSTRACT

An image forming apparatus includes a display that displays a normal operational screen and information other than the normal operational screen; an event detecting unit that detects an event occurring; a memory that stores pairs of first events and second events which have been configured beforehand; and a display switching controller that switches what is displayed on the display to a normal operational screen, when the event detecting unit detects the occurrence of a first event stored in the memory during display of information other than the normal operational screen on the display, and switches what is displayed on the display to information other than the normal operational screen, when the event detecting unit detects a second event paired with the first event.

7 Claims, 10 Drawing Sheets

FIG. 5

| FIRST EVENT | SECOND EVENT |
|---|---|
| PAGE PLACED | NO PAGE |
| AUTHENTICATION DONE | AUTHENTICATION CLEARED |
| COIN SLOTTED IN | ADDITIONAL COIN NEEDED |
| ON HOOK OF TELEPHONE SET | OFF HOOK OF TELEPHONE SET |
| PAPER TRAY DRAWN OUT | PAPER TRAY PUSHED BACK |
| INTERLOCK OPEN | INTERLOCK CLOSED |
| HARD KEY PRESSED | SOFT BUTTON PRESSED |

IMAGE FORMING APPARATUS, DISPLAY SWITCHING CONTROL METHOD, AND COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2007-177323 filed Jul. 5, 2007.

BACKGROUND

1. Technical Field

The present invention relates to an image forming apparatus that displays information other than a normal operational screen, such as advertising information, a display switching control method, and a computer readable medium storing a program therefor.

2. Related Art

Recently, an image forming apparatus such as copiers and printers is installed not only at offices, but also in public places where general public often come in, such as convenience stores, libraries, and city halls. A display attached to the image forming apparatus to display an operational screen is becoming larger. Consequently, some image forming apparatuses become capable of displaying information other than a normal operational screen, such as advertising information, on its display to make effective use of the display.

Once such advertising information or the like has been displayed on the image forming apparatus, the user needs to return what is displayed on the display from the advertising information to the normal operational screen when the user is going to put the image forming apparatus into use.

SUMMARY

An image forming apparatus according to an aspect of the invention includes a display that displays a normal operational screen and information other than the normal operational screen; an event detecting unit that detects an event occurring; a memory that stores pairs of first events and second events which have been configured beforehand; and a display switching controller that switches what is displayed on the display to a normal operational screen, when the event detecting unit detects the occurrence of a first event stored in the memory during display of information other than the normal operational screen on the display, and switches what is displayed on the display to information other than the normal operational screen, when the event detecting unit detects a second event paired with the first event.

BRIEF DESCRIPTION OF THE DRAWINGS

An exemplary embodiment of the present invention will be described in detail based on the following figures, wherein:

FIG. 5 illustrates an example of an event list stored in an event list memory 53;

DETAILED DESCRIPTION

Figure 1:
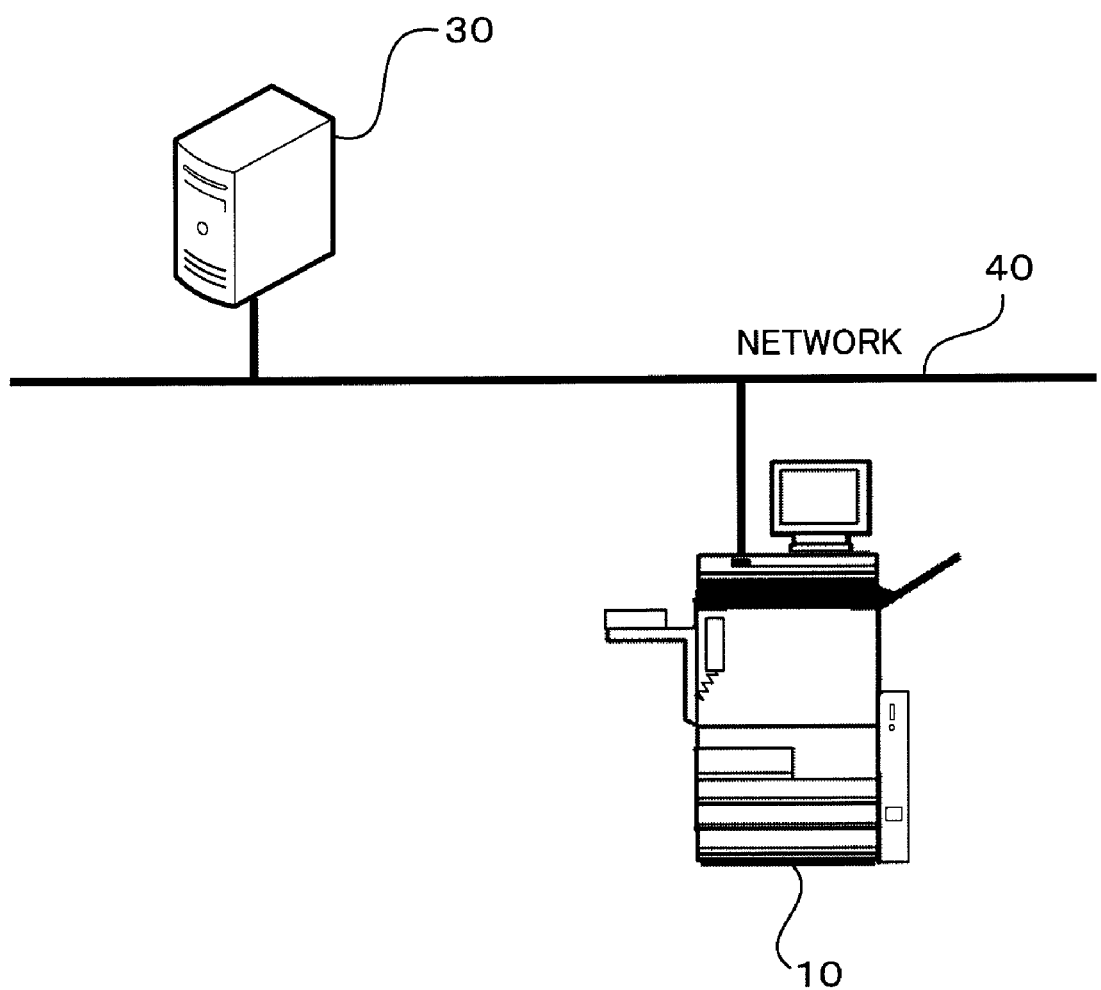
FIG. 1 is a system schematic depicting a framework of an image processing system for an exemplary embodiment of the invention.

In the following, an exemplary embodiment of the present invention will be described in detail with reference to the drawings. FIG. 1 illustrates a framework of an image processing system for an exemplary embodiment of the invention.

As shown in FIG. 1, the image processing system for the present exemplary embodiment includes an image forming apparatus 10 and an advertising information distribution server 30. The advertising information distribution server 30 stores a variety of advertising information to be presented on a display of the image forming apparatus 10 and distributes advertising information to the image forming apparatus 10 according to a prearranged procedure. The image forming apparatus 10 is a complex machine having a printing function, a copying function, a facsimile transmitting/receiving function, and a scanning function.

In the present exemplary embodiment, the invention is explained for a situation where advertising information is taken as information other than a normal operational screen. Alternatively, the invention can be applied in the same way for other situations where information other than advertising information such as information about train situation, nearby sightseeing information, and event information is displayed as information other than the operational screen on the display of the image forming apparatus 10.

Figure 2:
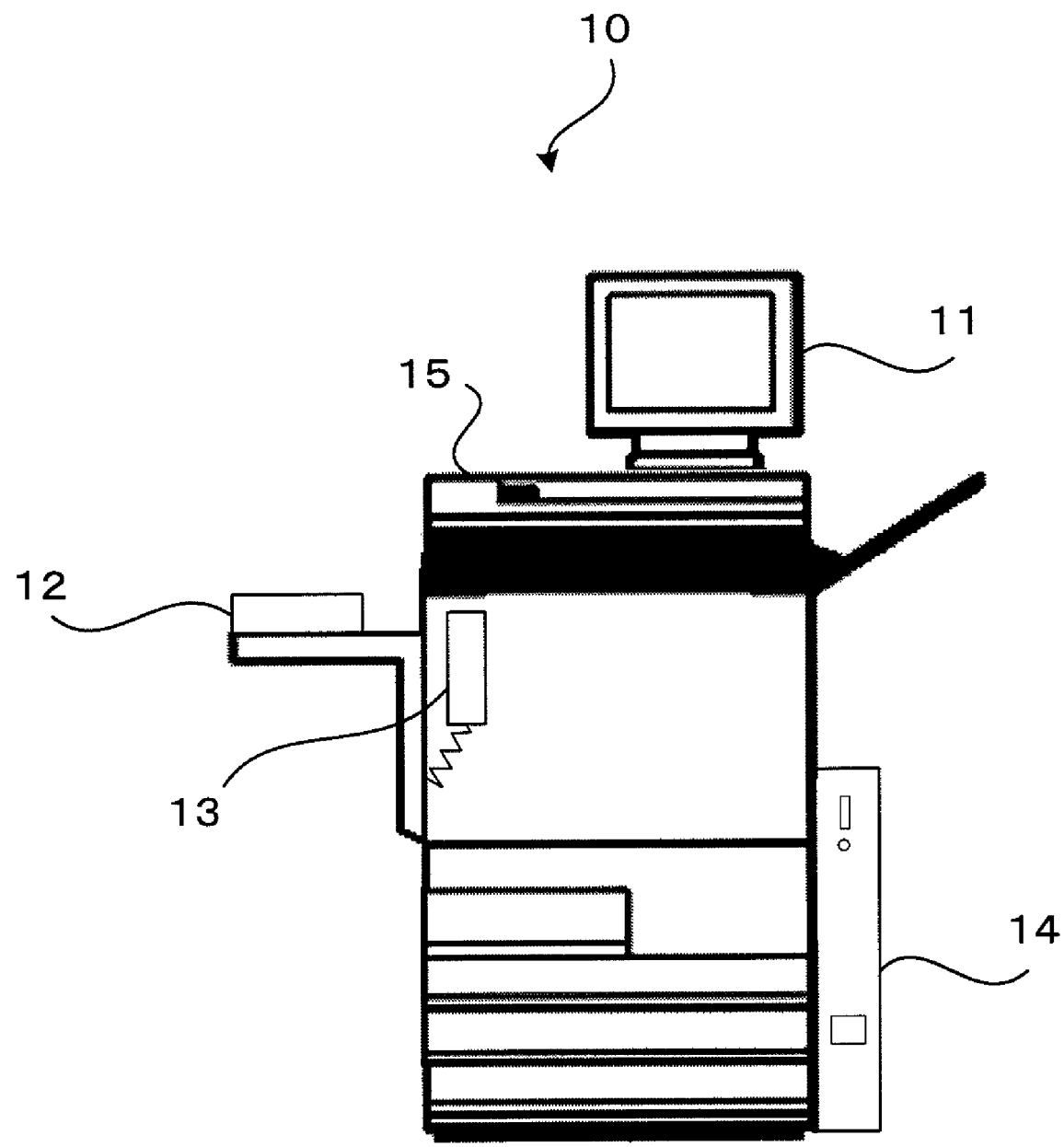
FIG. 2 is an enlarged outside view of an image forming apparatus 10 of an exemplary embodiment of the invention.

Next, an enlarged outside view of the image forming apparatus 10 of the present exemplary embodiment is shown in FIG. 2.

The image forming apparatus 10 of the present exemplary embodiment, as shown in FIG. 2, includes a display 11, an authentication device 12, a telephone set 13, a billing device 14, and an image reader 15.

The authentication device 12 authenticates a user who has an authentication card by reading information from the authentication card on which such information has already been stored, such as a contactless IC card. The telephone set 13 is linked to a public telephone line and can be used as an ordinary telephone. When the facsimile function of the image forming apparatus 10 is used, the user may first make a call to a destination over the telephone line, using the telephone set 13, and, after making sure of the connection to the destination, send facsimile data.

The billing device 14 is a device for billing a user who wants to use the apparatus without authentication for using the image forming apparatus 10. The billing device 14 is arranged to allow a user who has paid a fee by slotting in a coin to use the image forming apparatus 10 to a limit set for the fee paid. Because of provision of this billing device 14, the functions of the image forming apparatus 10 are also available to a user who does not have an authentication card.

The image reader 15 is a device for reading an image of an original to be copied, a page to be read in, or a page to fax.

Figure 3:
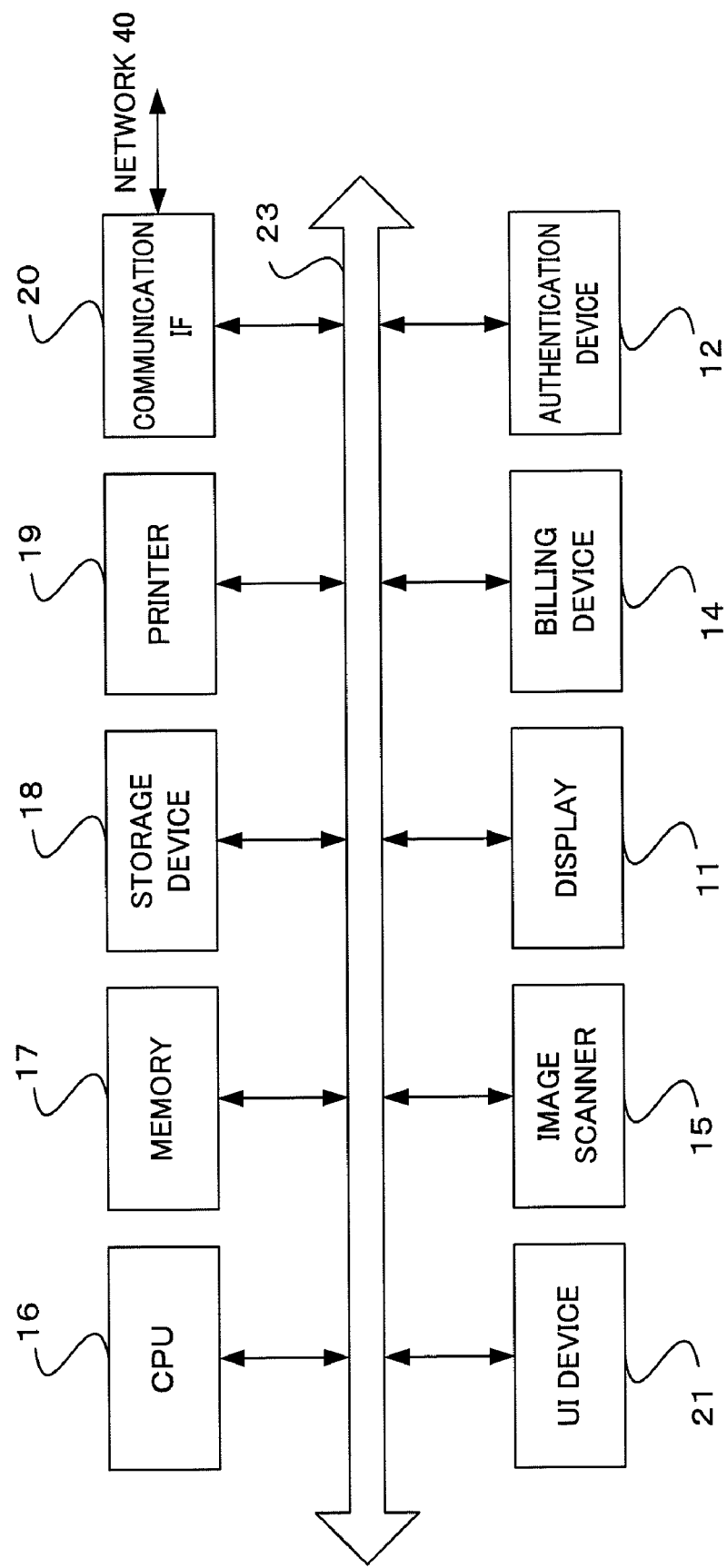
FIG. 3 is a block diagram showing a hardware structure of the image forming apparatus 10 of an exemplary embodiment of the invention.

Next, a hardware structure of the image forming apparatus 10 of the present exemplary embodiment is shown in FIG. 3.

The image forming apparatus 10, as shown in FIG. 3, includes a CPU 16, a memory 17, a storage device 18 such as a hard disk drive (HDD), a printer 19, a communication interface (IF) 20 which transmits and receives data to/from a remote machine such as the advertising information distribution server 30 and the like via the network 40, a user interface (UI) device 21 including a touch panel, manual operation buttons or indicator lamps and the like, an image reader 15, a display 11, a billing device 14, and an authentication device 12. These components are interconnected via a control bus 23.

The CPU 16 executes predetermined processing based on an image processing program stored in the memory 17 or the storage device 18 and controls the operation of the image forming apparatus 10.

Figure 4:
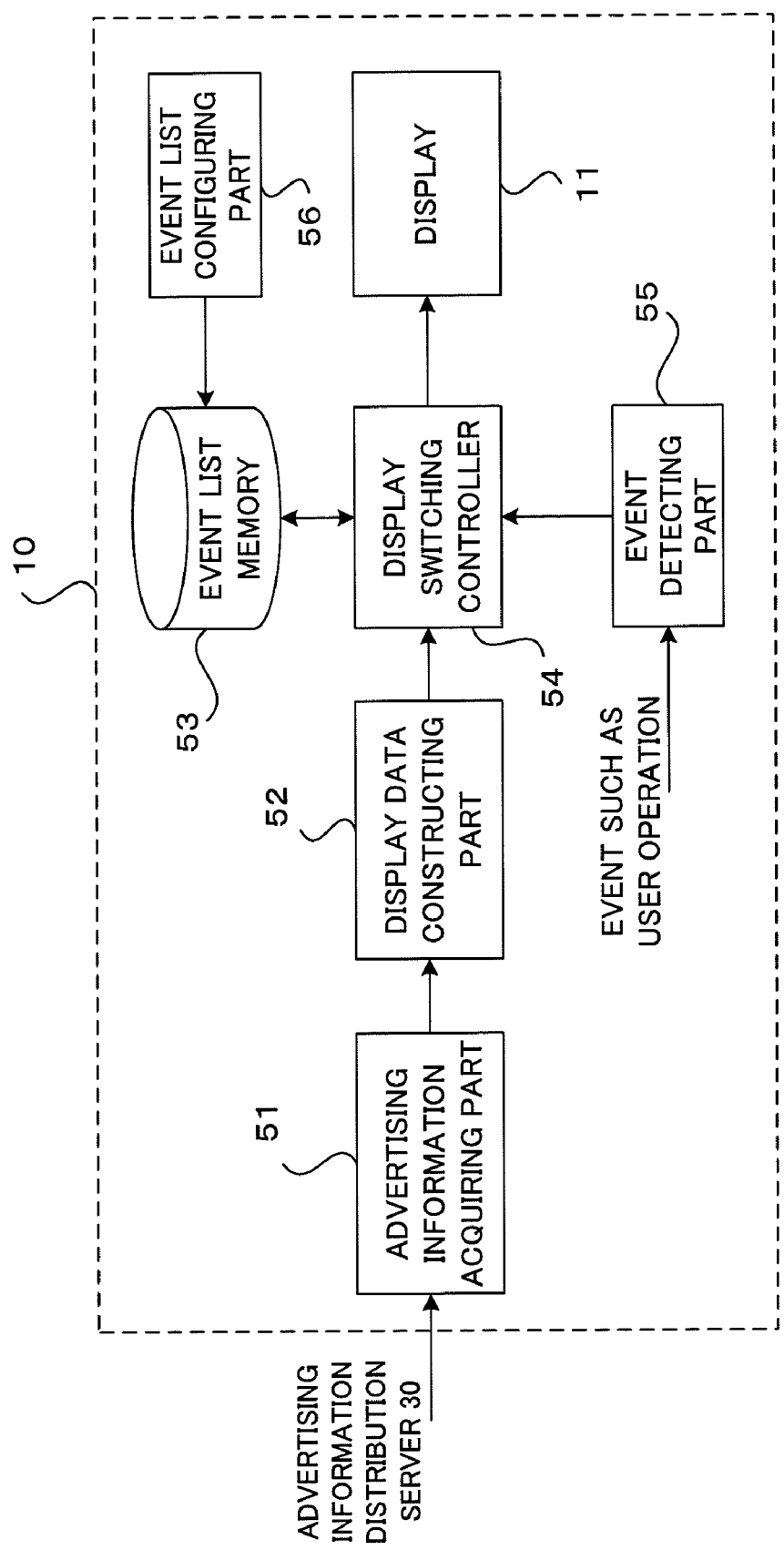
FIG. 4 is a block diagram showing an arrangement of functions of the image forming apparatus 10 of an exemplary embodiment of the invention.

FIG. 4 is a block diagram showing an arrangement of functions of the image forming apparatus 10, which are realized by executing the above image processing program.

The image forming apparatus of the present exemplary embodiment 10, as shown in FIG. 4, is provided with an advertising information acquiring part 51, a display data constructing part 52, an event list memory 53, a display switching controller 54, an event detecting part 55, an event list configuring part 56, and the display 11.

The advertising information acquiring part 51 acquires advertising information distributed from the advertising information distribution server 30 via the network 40.

The display data constructing part 52 generates image data to be displayed corresponding to advertising information acquired by the advertising information acquiring part 51 by use of application software such as a WWW (World Wide Web) browser. The display data constructing part 52 also generates image data to be displayed corresponding to a normal operational screen for operating the image forming apparatus 10 by use of the application software such as the WWW (World Wide Web) browser.

The event list memory 53 stores pairs of first and second events which have been configured beforehand. Events include user operations that are performed on the image forming apparatus 10, such as pressing a button and placing a page, and state changes of the apparatus occurring in consequence of an apparatus operation such as the termination of a copy operation or a fax transmission.

Then, an example of an event list which is stored in the event list memory 53 is shown in FIG. 5. In the event list memory 53, plural first events and plural second events which are paired are stored.

In the event list shown in FIG. 5, to a first event "page placed", an event "no page" is configured as a second event. Specifically, the first event occurs when a page is placed on the image reader 15 and the second event occurs when a page once placed is removed from the image reader 15.

In the event list shown in FIG. 5, likewise, to a first event "authentication done", a second event "authentication cleared" is configured. Specifically, the first event occurs when the user has been authenticated by completing an authentication process in which the user's authentication card is read by the authentication device 12. The second event occurs when the authentication state has been cleared at a time when the user finishes an intended process.

In the event list shown in FIG. 5, also, to a first event "coin slotted in", a second event "additional coin needed" is configured. Specifically, the first event occurs, whether the user has slotted in a coin into the billing device 14. The second event occurs when it is indicated by the billing device 14 that an additional coin is needed for further use.

In the event list shown in FIG. 5, also, to a first event "on hook of telephone set", a second event "off hook of telephone set" is configured. Specifically, the first event occurs when the user picks up the telephone set 13 from the holder attached to the chassis of the image forming apparatus 10. The second event occurs when the user replaces the telephone set 13 on the holder attached to chassis of the image forming apparatus 10.

In the event list shown in FIG. 5, further, to a first event "paper tray drawn out", a second event "paper tray pushed back" is configured. Specifically, the first event occurs when the user draws out the paper tray for stacking blank paper sheets from the chassis of the image forming apparatus 10. The second event occurs when the user pushes the paper tray back into place in the chassis of the image forming apparatus 10.

In the event list shown in FIG. 5, further, to a first event "interlock open", a second event "interlock closed" is configured. Specifically, the first event occurs when the user opens the cover of the image forming apparatus 10 because of paper jam or for some other reason. The second event occurs when the user closes the cover. Here, the interlock is a safety mechanism for preventing the user from being exposed to danger by detecting that the cover or the like has been opened and stopping the operation of the image forming apparatus 10.

In the event list shown in FIG. 5, furthermore, to a first event "hard key pressed", a second event "soft button pressed" is configured.

Figure 6A:
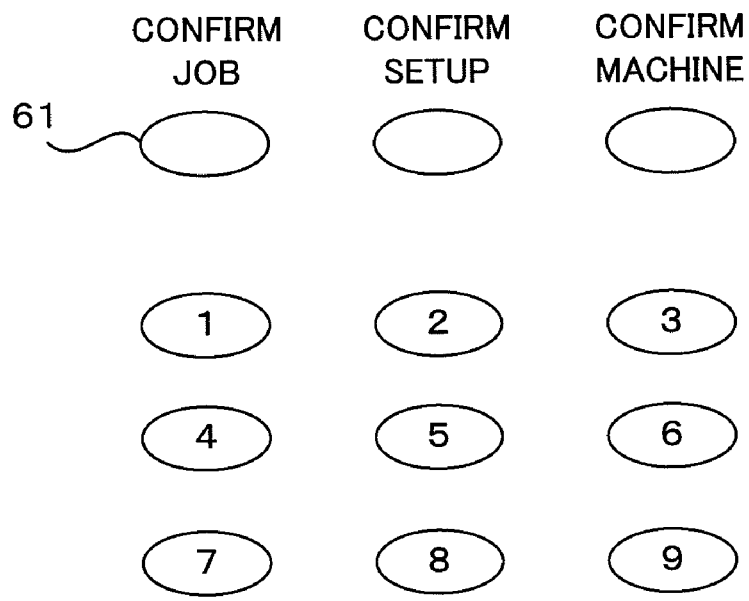
FIGS. 6A and 6B illustrate examples of hard keys and a soft button.
Figure 6B:
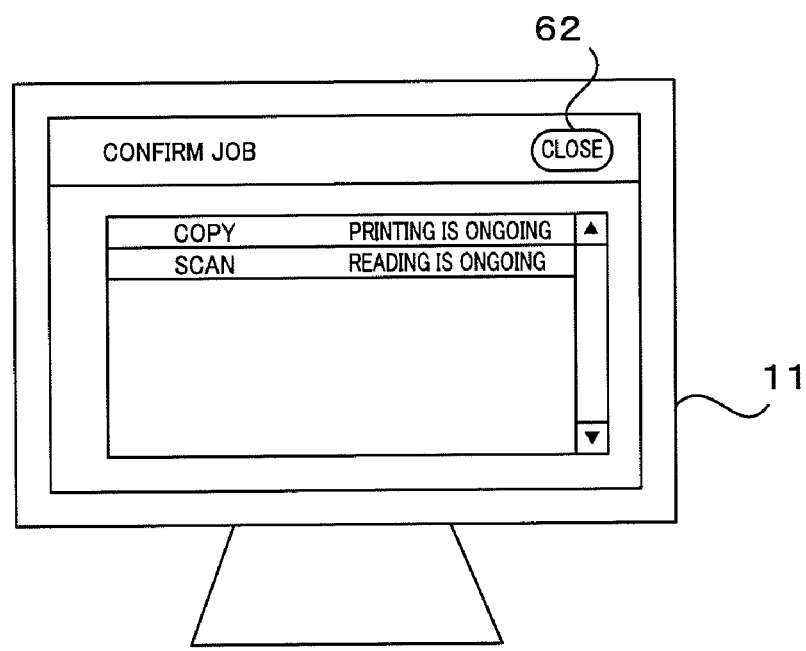

Here, the hard key and soft button are explained with reference to FIGS. 6A and 6B. FIG. 6A illustrates an example of hard keys and FIG. 6B illustrates an example of a soft button. In FIG. 6A, there is a "Confirm Job" hard key 61. By pressing this hard key 61, a job confirmation screen as shown in FIG. 6B appears on the display 11. In the job confirmation screen shown in FIG. 6B, there is a soft button 62 for closing the job confirmation screen. When the user touches this soft button 62, the job confirmation screen closes and the display reverts to the previous state.

With regard to the example shown in FIGS. 6A and 6B, if pressing the hard key 61 for opening the job confirmation screen is configured as the first event, pressing the soft button 62 for closing the job confirmation screen is configured as the second event. Specifically, the first event occurs when the hard key 61 for job confirmation has been pressed. The second event occurs when the soft button 62 for closing the job confirmation screen has been pressed.

The event detecting part 55 detects an event that has now occurred in the image forming apparatus 10. The event list configuring part 56 configures a pair of a first event and a second event to be stored in the event list memory 53.

The display switching controller 54, during display of advertising information, switches what is displayed on the display 11 to a normal operational screen when the event detecting part 55 detects the occurrence of a first event stored in the event list memory 53 and switches what is displayed on the display 11 to advertising information when the event detecting part 55 detects the occurrence of the second event paired with the first event.

Display switching control by the display switching controller 54 is explained with reference to FIGS. 7A and 7B.

The display switching controller 54 prepares in advance Window 1 to display a normal operational screen and Window 2 to display information other than the normal operational screen and switches what is displayed on the display 11 by changing the window displayed to the fore.

Figure 7A:
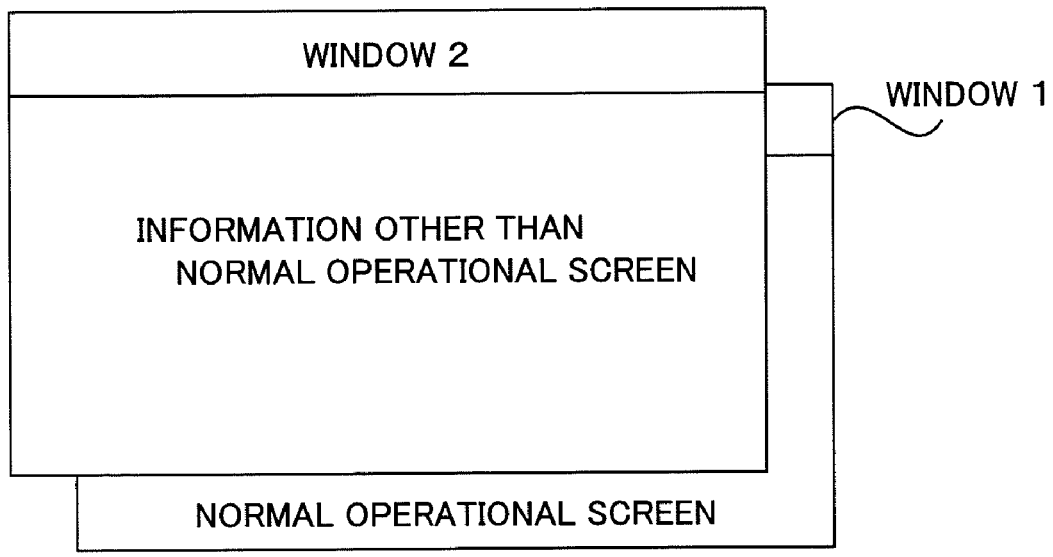
FIGS. 7A and 7B illustrate an example of display switching control by a display switching controller 54.
Figure 7B:
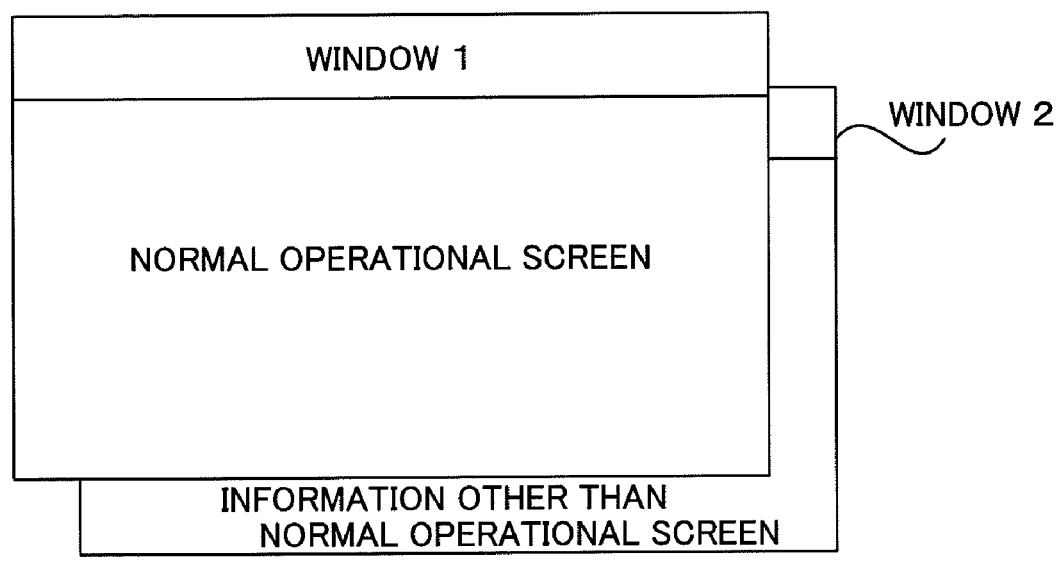

For example, in FIG. 7A, the display switching controller 54 displays Window 2 where information other than the normal operational screen is displayed to the fore over Window 1. Thereby, information other than the normal operational screen is displayed on the display 11. In this state, when Window 1 is displayed to the fore, as shown in FIG. 7B, then the normal operation screen is displayed on the display 11.

Figure 8A:
FIGS. 8A and 8B illustrate an example of control by which switching between a normal operational screen and advertising information is performed on the display 11.
Figure 8B:
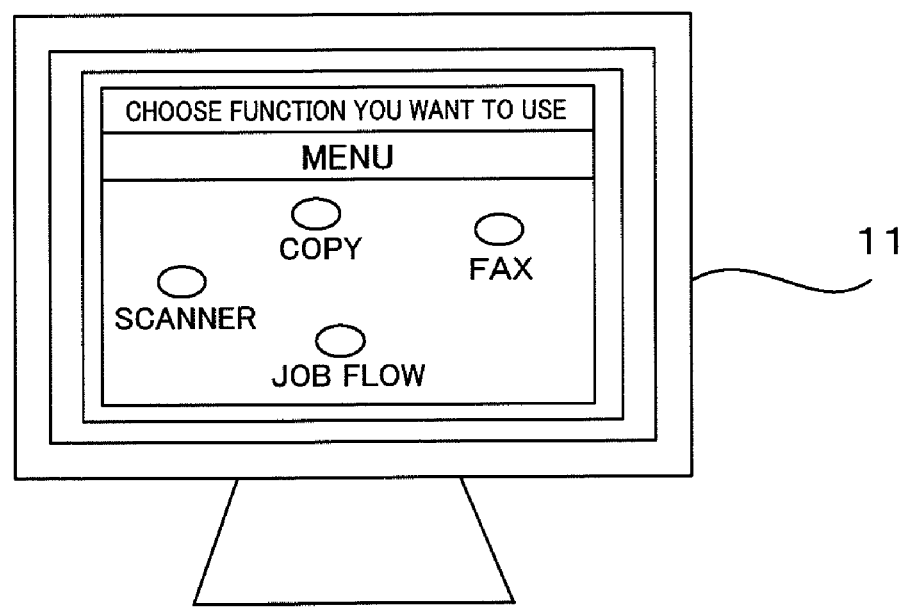

An example of switchover between the normal operational screen and information other than the normal operational screen performed in this way on the display 11 is shown in FIGS. 8A and 8B.

FIG. 8A is an illustration depicting an example of advertising information "We offer full line of mobile phones, at XXX Electronics Store" displayed on the display 11. FIG. 8B is an illustration depicting an example of the normal operational screen, a menu screen for choosing any of the functions of the image forming apparatus 10, displayed on the display 11.

In the image forming apparatus 10 of the present exemplary embodiment, control is performed such that what is displayed on the display 11 is switched between advertising information as exemplified in FIG. 8A and a normal operational screen as exemplified in FIG. 8B in conjunction with the occurrence of a first event or a second event stored in the event list memory 53.

Next, the operation of the image forming apparatus 10 of the present exemplary embodiment is explained in detail with reference to the drawing.

Figure 9:
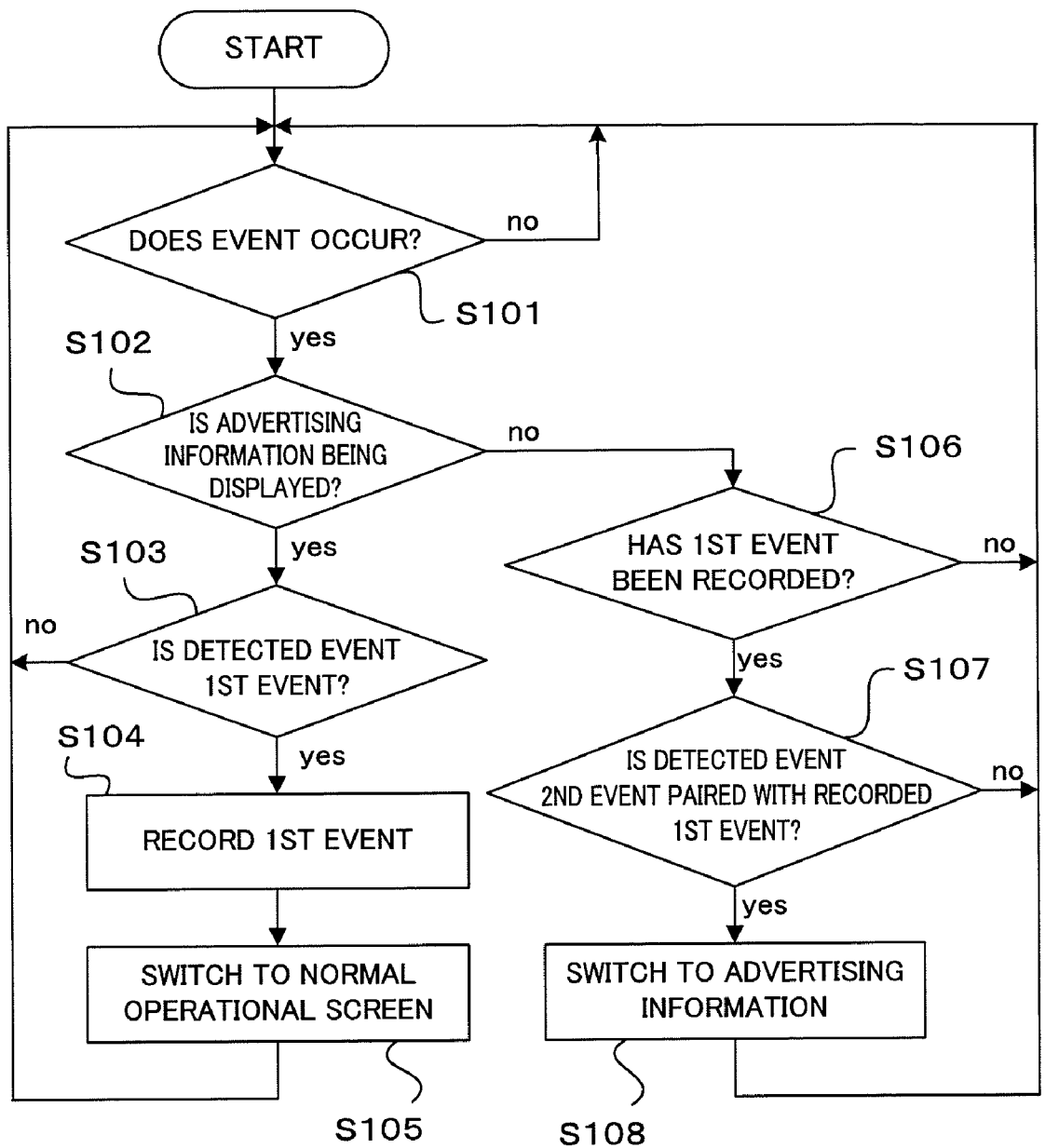
FIG. 9 is a flowchart illustrating the operation of the image forming apparatus of an exemplary embodiment of the invention.

The operation of the image forming apparatus 10 of the present exemplary embodiment is illustrated in a flowchart of FIG. 9.

First, the advertising information acquiring part 51 acquires advertising information distributed from the advertising information distribution server 30 via the network 40. The display data constructing part 52 generates image data to be displayed corresponding to the advertising information acquired by the advertising information acquiring part 51. Also, the display data constructing part 52 generates image data to be displayed corresponding to a normal operational screen for operating the image forming apparatus 10. Here, it is assumed that the display switching controller 54 switched what is displayed on the display 11 to advertising information, because no user action took place for a certain period of time or longer.

In such state, when the event detecting part 55 detects the occurrence of any event in the image forming apparatus 10 (step S101), the display switching controller 54 determines whether advertising information is now being displayed on the display 11 (step S102). If advertising information is being displayed on the display 11, the display switching controller 54 determines whether the event detected by the event detecting part 55 is any first event in the event list stored in the event list memory 53 (step S103).

If, at step S103, the event detected by the event detecting part 55 does not match any first event, the display switching controller 54 waits until any event occurs in the image forming apparatus 10 (step S101). If, at step S103, the event detected by the event detecting part 55 matches any first event, the display switching controller 54 records the first event (step S104) and switches what is displayed on the display 11 from the advertising information to a normal operational screen (step S105).

Then, when the occurrence of any event is detected by the event detecting part 55 (step S101), the display switching controller 54 determines whether advertising information is now being displayed on the display 11 (step S102). At this time, because the normal operational screen is displayed on the display 11, the display switching controller 54 determines whether the first event has been stored (step S106). At this time, because the first event has been recorded at step S104, the display switching controller 54 determines whether the event detected by the event detecting part 55 is the second event recorded as the one paired with the recorded first event (step S107).

If, at step S107, the event detected by the event detecting part 55 does not match the second event, the display switching controller 54 waits until any event occurs in the image forming apparatus 10 (step S101). If, at step S107, the event detected by the event detecting part 55 matches the second event, the display switching controller 54 switches what is displayed on the display 11 to advertising information (step S108).

Figure 10:
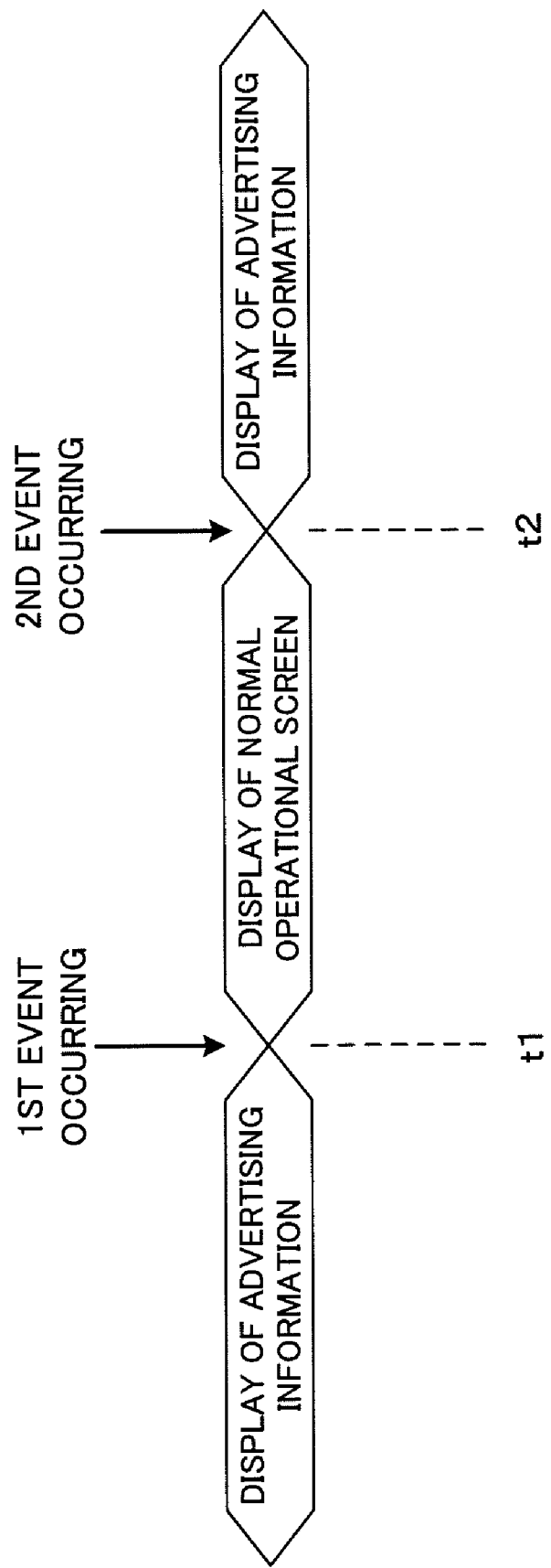
FIG. 10 is a diagram to explain timings at which what is displayed on the display 11 is switched by the occurrences of first and second events.

Timings at which what is displayed on the display 11 is switched in this way in conjunction with the occurrence of first and second events are explained with reference to FIG. 10.

In the state where advertising information as exemplified in FIG. 8A is displayed on the display 11, when a first event occurs (time t1), what is displayed on the display 11 is switched to a normal operational screen display as illustrated in FIG. 8B. In this state, when a second event configured as the one paired with the first event occurs (time t2), what is displayed on the display 11 is switched to advertising information display as exemplified in FIG. 8A.

In the image forming apparatus 10 of the present exemplary embodiment, once what is displayed has been switched from advertising information to a normal operational screen upon the occurrence of a first event, it is arranged to return to information other than the normal operational screen upon the occurrence of the second event configured in pair with the first event.

During display of advertising information on the display 11, for example, when the user places a page on the image reader 15 to copy the page, what is displayed is switched from the advertising information to a normal operational screen. After the user operates the image forming apparatus 10 and a copying process is executed, when the page placed on the image reader 15 is removed, what is displayed on the display 11 is switched from the normal operational screen to the advertising information and returns to what is displayed before the copy operation.

Thus, in the image forming apparatus of the present exemplary embodiment 10, once what is displayed has been switched from advertising information to a normal operational screen by an event of placing a page on the image reader 15, configured as a first event, what is displayed is switched to the advertising information upon the removal of the page placed on the image reader 15, registered as a second event paired with the first event, instead of switching what is displayed on the display 11 to the advertising information after the wait for a certain period of time during which no user action takes place.

MODIFICATION EXAMPLE

In the foregoing exemplary embodiment, the invention has been explained for the situation where information other than a normal operational screen, such as advertising information, is displayed on the display 11 of the image forming apparatus 10; however, the present invention is not so limited. The present invention can be applied in the same way to situations where information different from information that is ordinarily displayed, such as advertising information and various kinds of guidance information, in an information processing apparatus with a display such as an ATM (Automated Teller Machine) terminal device and a POS (Point-Of-Sales) terminal device.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image forming apparatus comprising:
    a display that displays a menu screen for choosing functions of the image forming apparatus or advertising information;
    an event detecting unit that detects an event occurring;
    a memory that stores a list of pairs of first events and second events which have been configured beforehand, the list including at least a first pair and a second pair, the first pair comprising a first pair first event indicating that an original is placed on an image reader, and a corresponding first pair second event indicating that the original is removed from the image reader, and the second pair comprising a second pair first event indicating that a billing unit receives an initial payment for using the image forming apparatus, and a corresponding second pair second event indicating that additional payment is required by the billing unit for further use of the image forming apparatus; and
    a display switching controller that switches what is displayed on the display to the menu screen for choosing functions of the image forming apparatus, if the event detecting unit detects the occurrence of a first event, from among the first events stored in the memory, during display of the advertising information on the display, and switches what is displayed on the display to the advertising information, if the event detecting unit detects a second event, from among the second events stored in the memory, and the detected second event is stored with the first event as a pair in the memory,
    wherein the image forming apparatus performs one or more of a printing function, a copying function, a facsimile function, and a scanning function.

2. The image forming apparatus according to claim 1, further comprising a configuration unit that configures first events and second events to be stored in the memory.

3. A display switching control method for switchover between a menu screen for choosing functions of an image forming apparatus and a screen displaying advertising information on a display included in the image forming apparatus, the display switching control method comprising:
    storing, in a memory, a list of pairs of first events and second events which have been configured beforehand, the list including at least a first pair and a second pair, the first pair comprising a first pair first event indicating that an original is placed on an image reader, and a corresponding first pair second event indicating that the original is removed from the image reader, and the second pair comprising a second pair first event indicating that a billing unit receives an initial payment for using the image forming apparatus, and a corresponding second pair second event indicating that additional payment is required by the billing unit for further use of the image forming apparatus;
    switching what is displayed on the display to the menu screen for choosing functions of the image forming apparatus, if the occurrence of a first event, from among the stored first events, is detected during display of the advertising information on the display; and
    switching what is displayed on the display to the advertising information, if the occurrence of a second event, from among the stored second events, is detected and the detected second event is stored with the first event as a pair in the memory,
    wherein the image forming apparatus performs one or more of a printing function, a copying function, a facsimile function, and a scanning function.

4. A non-transitory computer readable medium storing a program causing a computer to perform a display switching control method for switchover between a menu screen for choosing functions of an image forming apparatus and a screen displaying advertising information on a display included in the image forming apparatus, the program comprising computer executable instructions causing the computer to perform the following:
    storing, in a memory, a list of pairs of first events and second events which have been configured beforehand, the list including at least a first pair and a second pair, the first pair comprising a first pair first event indicating that an original is placed on an image reader, and a corresponding first pair second event indicating that the original is removed from the image reader, and the second pair comprising a second pair first event indicating that a billing unit receives an initial payment for using the image forming apparatus, and a corresponding second pair second event indicating that additional payment is required by the billing unit for further use of the image forming apparatus;
    switching what is displayed on a display to the menu screen for choosing functions of the image forming apparatus, if the occurrence of a first event, from among the stored first events, is detected during display of the advertising information on the display; and
    switching what is displayed on the display to the advertising information, if the occurrence of a second event, from among the stored second events, is detected and the detected second event is stored with the first event as a pair in the memory,
    wherein the image forming apparatus performs one or more of a printing function, a copying function, a facsimile function, and a scanning function.

5. The non-transitory computer readable medium of claim 4, wherein the advertising information is displayed on the display via a web browser.

6. The image forming apparatus of claim 1, wherein the display displays the advertising information via a web browser.

7. The display switching control method of claim 3, wherein the advertising information is displayed on the display via a web browser.

* * * * *